United States Patent [19]

Deckenback et al.

[11] 4,248,559
[45] Feb. 3, 1981

[54] CONTROLLED DEPTH SCORING SYSTEM

[75] Inventors: Carl M. Deckenback, Jackson; George T. Catrombon; Lester A. Rowe, both of Somerville, all of N.J.

[73] Assignee: Union Carbide Corporation, New York, N.Y.

[21] Appl. No.: 23,406

[22] Filed: Mar. 23, 1979

Related U.S. Application Data

[63] Continuation-in-part of Ser. No. 828,205, Aug. 26, 1977, abandoned.

[51] Int. Cl.³ .............................................. B23D 5/02
[52] U.S. Cl. .................................... 409/307; 408/82; 409/65; 409/140
[58] Field of Search ...................... 408/80, 81, 82, 83, 408/78; 82/5, 82; 51/290, 349; 409/65, 140, 191, 199, 306, 307

[56] References Cited

U.S. PATENT DOCUMENTS

| 1,977,491 | 10/1934 | Schaaf | 409/307 |
|---|---|---|---|
| 2,029,429 | 2/1936 | Hill | 51/290 |
| 2,257,609 | 9/1941 | Kollath | 408/78 |
| 2,771,820 | 11/1956 | Meyers et al. | 409/307 |
| 3,213,525 | 10/1965 | Creighton et al. | 409/306 |
| 3,293,963 | 12/1966 | Carroll et al. | 82/82 |
| 3,326,086 | 6/1967 | Whitehill | 409/199 |
| 3,859,877 | 1/1975 | Sherer et al. | 82/82 |
| 4,084,484 | 4/1978 | Shklynov et al. | 409/140 |
| 4,096,723 | 6/1978 | Rhodes et al. | 72/123 |
| 4,129,062 | 12/1978 | Bergmann et al. | 409/140 |

*Primary Examiner*—John Sipos
*Attorney, Agent, or Firm*—Clement J. Vicari

[57] ABSTRACT

A system is disclosed for the controlled depth scoring of conduits for the pneumatic transfer of particulate plastic materials comprising: a scoring assembly having interconnected drive power inlet means, motor drive means, drive coupling means, centering means and controlled depth score cutting means; and feed means connected therewith for longitudinally passing said scoring assembly through said conduits at a controllable uniform speed.

5 Claims, 6 Drawing Figures

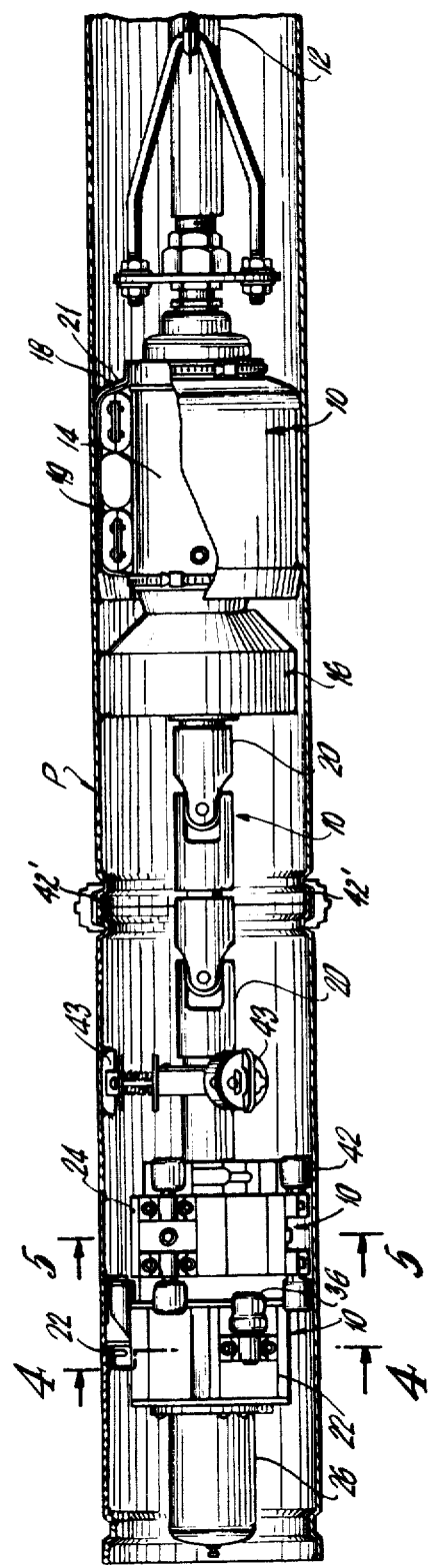
FIG. I

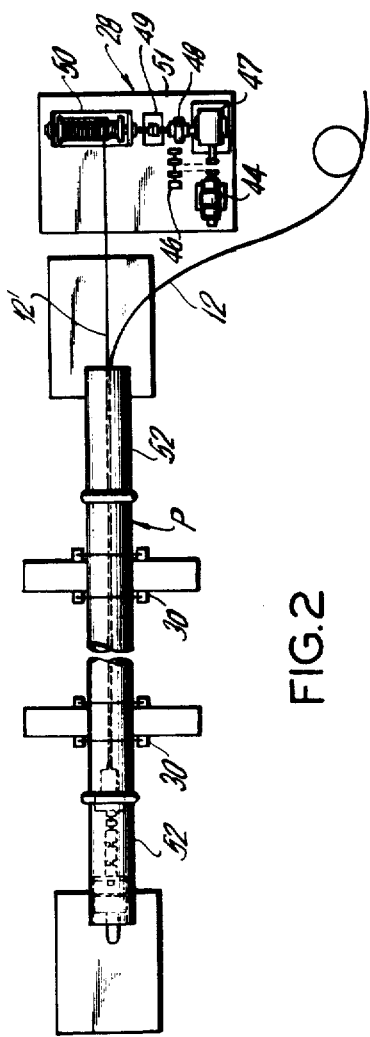
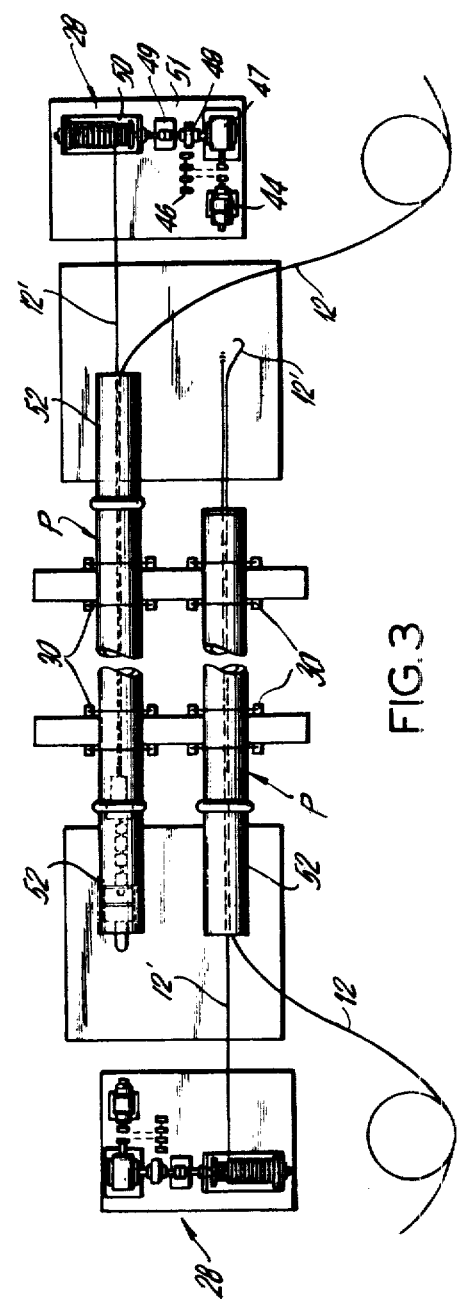

CONTROLLED DEPTH SCORING SYSTEM

This is a continuation-in-part of our prior copending patent application Ser. No. 828,205 filed Aug. 26, 1977 and entitled "Controlled Depth Scoring System" now abandoned.

The present invention relates to a controlled depth scoring system for pneumatic conveying lines.

Polyethylene and other similar plastics require internally roughened metallic tubing for their pneumatic conveying lines in order to minimize the formation of ribbon-like streamer contamination.

Prior methods of removing metal from the inner surface of conveying lines in a series of random and discontinuous grooves by means of a rotating air-driven tool are slow and labor-intensive processes. Prior tools are pulled manually through such conveying lines at a rate of one or two feet per minute. Five or more passes are sometimes required before a satisfactory inner surface roughness is achieved. The investigation of many of such prior scoring methods has indicated: the operation of tools at speeds far in excess of that required by normal machining operations; the employment of inadequate horsepower equipment; and the employment of cutting blades (tool bits) improperly designed for the job they are intended to do. The inability of the cutting mechanism to center itself in the conveying pipe results in scoring unevenly around the inside periphery of the pipe. Lack of any mechanism for controlling the depth of cut causes gouging and, in some instances, destruction of the conveying pipe before it has ever been put in service. The formation of a surface configuration too rough in spots causes the generation of fines (the breaking up of pellets into fine powder form), while surface configuration too smooth in other areas causes the generation of streamers.

Such prior conveying lines continually require rescoring in order to maintain a minimum of material losses due to fines and streamer generation and a minimum of maintenance problems associated with them further downstream.

The controlled depth scoring system of the present invention provides a faster, less expensive means of scoring while providing a uniform, continuous spiral groove of consistent depth. It provides increased conveyer line life, minimizes the generation of fines and streamers and the downstream problems associated with them, thereby contributing significantly to polyethylene handling and conveying.

SUMMARY OF THE INVENTION

Apparatus for the controlled depth scoring of a continuous spiral groove on the interior walls of conduits comprising a scoring assembly having inter-connected:
(a) rotatable controlled depth score cutting means,
(b) rotatable centering means,
(c) rotary motor having a stator,
(d) means for transmitting rotary motion from (c) to (a) and (b), and
(e) an anti-rotational device, capable of contacting the interior walls of said conduits, wherein said contact is adapted to prevent rotation of said stator while allowing longitudinal movement of said stator within said conduit during rotation of said cutting means,
further comprising feed means connected with said scoring assembly for longitudinally passing said scoring assembly through the interior of said conduits at a controllable uniform speed during rotation of said cutting means to thereby cut a spiral groove in said conduit. All of said rotatable components of the scoring assembly are rotated by said motor drive means while said controlled depth score cutting means are maintained in scoring engagement with the interior walls of said conduit by said centering means.

The preferred embodiment of the system of the present invention is that shown and described herein and in the appended drawings, wherein the component means of the scoring assembly are sequentially arranged as set forth immediately above. However, it is to be understood that the sequence of component means may be otherwise arranged without losing the interacting desired functions of the component means. For example, the centering means and the controlled depth score cutting means may be reversed in sequential position with little or no effect on the scoring produced.

In the drawings:

FIG. 1 is an elevational view showing the scoring assembly system of the invention in position within a conveying conduit being scored and shown in longitudinal section;

FIG. 2 is a schematic plan view of the scoring assembly system of the invention having associated feed means for passing the assembly through the conduit being scored;

FIG. 3 is a schematic plan view of two scoring assembly systems of the type shown in FIG. 2, each having associated feed means;

Figure 4:
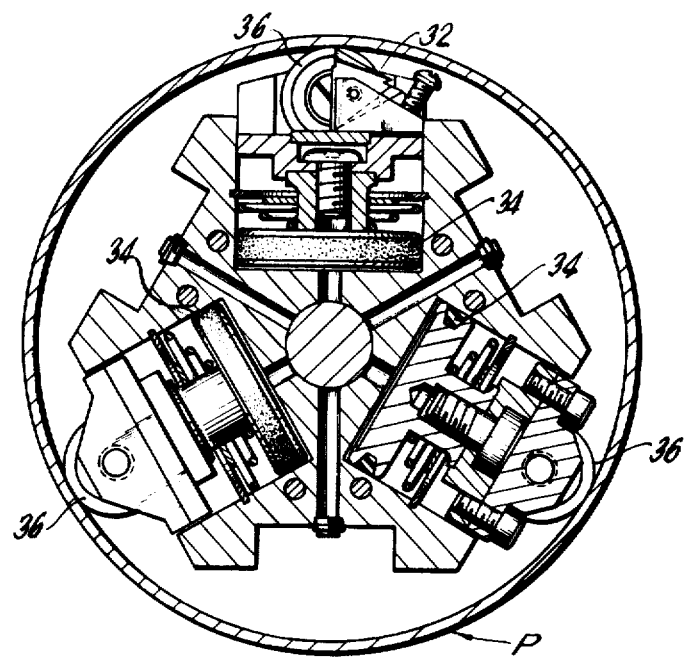
FIG. 4 is an enlarged cross-sectional view taken along the line 4—4 of FIG. 1.
Figure 5:
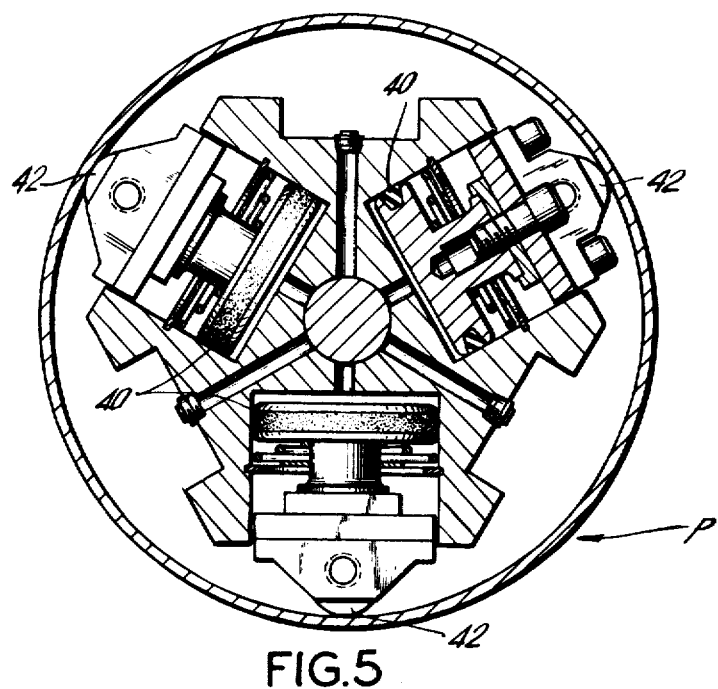
FIG. 5 is an enlarged cross-sectional view taken along the line 5—5 of FIG. 1.
Figure 6:
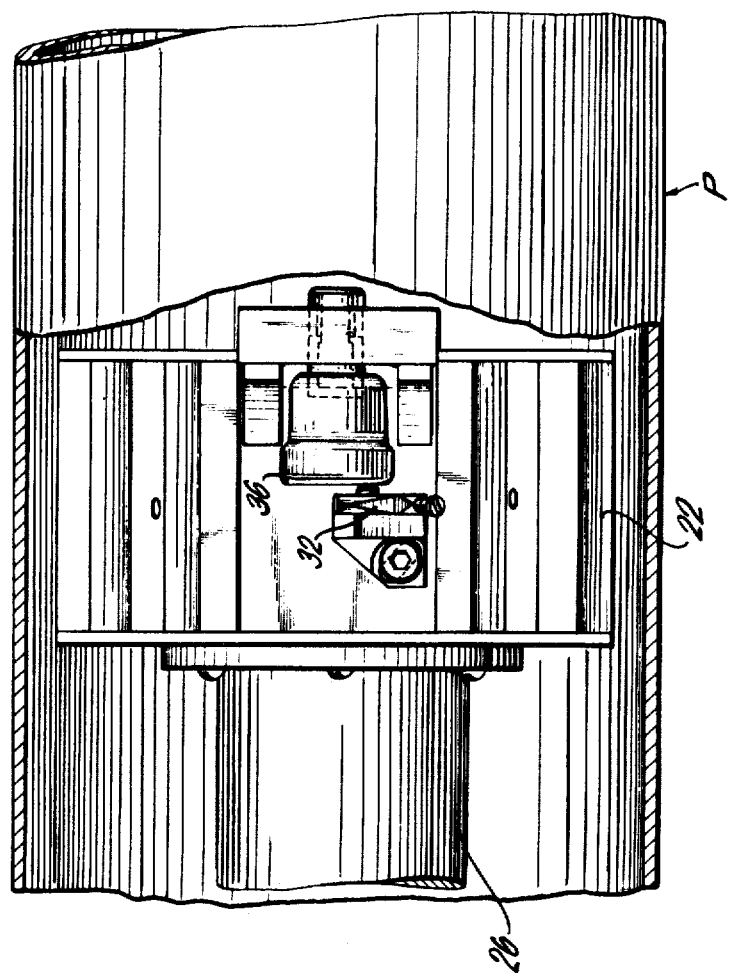
FIG. 6 is an enlarged partial plan view of the score cutting means portion of the assembly system of the invention in position within the conduit being scored.

In conjunction with the apparatus of the embodiment of the apparatus of the drawings, an air (pneumatic) source (not shown) of sufficient size and capacity is employed to drive the air motor which provides rotation of the rotatable components of the scoring assembly system and the air motor which drives the windup for the feed means. The air should be filtered and the units lubricated to protect and extend the life of both these units. The air supply hose connected to the scoring mechanism must be sized for the pressure, volume and abrasive service it encounters and must be of sufficient length to accommodate the maximum length of scoring envisioned.

As shown in the embodiment of the drawings, the scoring assembly system 10 comprises an air power inlet means 12, motor drive means 14 with gear head attachment 16, an anti-rotational device 18, universal joint drive coupling means 20, piston-mounted hydraulic cutting means 22 and centering means 24, and an accumulator 26.

The wind-up mechanism or feed means 28 pulls the cutting device through the pipe or tubing to be scored at a predetermined, uniform velocity. It consists of an air motor with forward and reverse control, an air regulator to control velocity within set limites, a wind-up spool with sufficient cable to accommodate the largest job envisioned, a gear reducer, an in-out coupler to disengage the wind-up spool from the gear reducer, and a clutch to prevent damage should the scoring device jam in the tube.

A schematic view of the controlled depth scoring system assembly 10 is shown in FIG. 1 and in greater detail in FIGS. 2 and 3. FIG. 2 shows a single system set-up for scoring a small amount of pipe or tubing P. FIG. 3 shows a more practical set-up for double system production-type scoring.

The pipe or tubing P to be scored is secured by means 30 so that it cannot rotate or move laterally, transition pieces are coupled to each end (these allow scoring over the entire length of the pipe), the air hose 12 and wind-up cable 12' are inserted through the pipe, and the scoring mechanism is attached. The assembly system 10 guided by hand into the pipe and the accumulator 26 is then pressurized, forcing the piston-mounted centering 24 and cutting 22 devices against the pipe wall. The wind-up feed means 28 is actuated and, as soon as the pull cable 12' slack is taken up, the air motor 14 driving the scoring mechanism is actuated and the length of pipe P is scored.

A triangular-type, throw-away tool bit 32 (FIG. 4) is held in a cutting position at the end of a hydraulic or pneumatic piston 34 and forced against the inner walls of the pipe or tubing P by hydraulic or penumatic pressure. The depth of cut is controlled by the setting of this tool bit in relation to the adjacent wheel 36.

An accumulator/reservoir 26 is mounted at the end of the scoring assembly mechanism (as an accumulator) to maintain the force necessary to push tool bit 32 into the workpiece throughout the entire operation as well as to supply the force which holds the assembly mechanism centered in the workpiece or as a reservoir to provide sufficient volume to do the aforementioned by pneumatic means alone.

The entire scoring assembly mechanism 10 is centered in pipe P by means of pistons 40 which hold wheels 42 against the inner walls of the pipe or tubing P as the assembly mechanism 10 rotates. These pistons which immediately precede the cutting tool into the pipe may be restricted from operating independently by use of a sliding device.

Spring-loaded, non-rotatable skid-means 43 may precede or follow the centering and scoring means into the pipe or tubing and may be employed to prevent wobble as the centering wheels go over coupling grooves. This skid means 43 is not necessary in pipe or tubing with other than rolled coupling grooves known in the field as "Victaulic" grooves.

The cutting tool, centering device and skid means are kept virtually independent of the driving mechanism (air motor 14) by means of a double universal joint 20. This independence also permits successful operation around pipe curves of limited radius.

The entire controlled depth scoring assembly mechanism is pulled through the workpiece P by a pull-through feed means 28 (wind-up mechanism) at a predetermined speed.

A brake and anti-rotational device 18 is attached to the stator of air motor 14. It may consist of one or more small, inflatable inner tubes 19 covered with a loose leather jacket 21. When the tube/tubes are inflated, the tendency of the air motor to rotate in the direction opposite the bite is minimized should the scoring bit jam in the workpiece. This device also eliminates jump over internal coupling groove 42 should pipe P of this type be scored.

The feed means 28 is comprised of an air motor 44 geared to a reduced speed, a set of sprockets 46 for further speed modifications, a gear reducer 47, clutch 48 and engaging mechanism 49 and wind-up reel 50, all mounted on a convenient and movable table 51.

Considerable improvement over previous roughening systems is manifested by the controlled depth scoring system of the invention. The depth of cut is controlled throughout the entire scoring operation by the relative position of wheel 36 adjacent to the cutting tool 32. The lead (of the machined groove) is constant, being predetermined and controlled by the wind-up mechanism.

The tool bit is held in a cutting position by hydraulic or pneumatic pressure throughout the entire scoring operation as the scoring mechanism is passed through the workpiece at a constant speed. The resulting machined pattern is a continuous spiral groove of a preferred, specific configuration.

The lead is constant, being predetermined and controlled by the feed means. This, in conjunction with a controlled depth, results in uniform grooves from one scored pipe section to another as well as from plant to plant.

By incorporating proper rotary speed, horsepower and cutting tools with the proper feed rate, the labor savings alone in initial scoring and rescoring represents a twenty-fold savings over previous roughening systems.

The reduction of streamers brought about by capability of the system of the invention to provide optimal scoring configurations significantly reduces the time and labor required to continually disassemble and clean downstream equipment, as well as results in material savings as little waste in the form of streamers will be generated.

The anti-rotational device eliminates the possibility of the air motor rotating should the cutting tool jam and develop a torque in the direction opposite the cut.

The accumulator once charged provides a constant force on the scoring mechanism and centering device throughout the entire scoring operation.

The controlled depth scoring system of the invention is applicable to pipe or tubing of any length or diameter as well as to any material. The system is also capable of scoring around bends of limited radius.

As the scoring mechanism is pulled through the pipe or tubing, the air which supplies the rotary motion leaves the air motor and is blown past the scoring device, blowing the chips out.

In addition to being able to control the depth of cut, the angle at which the tool bit contacts the workpiece may also be varied as desired to accomodate the speed at which the unit is being passed through the pipe.

By motorizing the feed means sub-system, the present invention has eliminated the slow and laborious method of hand-pulling scoring tools through conveying lines. This, of course, has contributed significantly to the ability to maintain a constant lead, continuous spiral groove and uniform grooves.

The force applied to cutting mechanisms is sufficient to keep the tool bit embedded to its present depth, giving a long score chip which is blown out the end of the scored tubing. This lends itself to easier clean-up and a minimum of post-scoring preparation before putting a scored conduit into, or back into, operation. Normally, the conduits are flushed with water and offgrade material is run through them to remove any vestiges of the scoring operation.

There is an infinite variety of groove cross-sections which may be cut. Triangular, semicircular or rectangular cross-sections, or any combination thereof are attainable; provided sufficient force is employed to force the scoring tool bit into the workpiece and sufficient power is employed to rotate the cutting mechanism once the scoring tool bit is in place.

The scoring means employed therein is such that a variety of scored patterns is obtainable. A diamond-type scored configuration is attainable by rescoring in the direction counter to that previously scored. By providing tool bits (non-rotating) which precede the cutting mechanism into the pipe, both a longitudinal and spiral groove pattern is obtained (parallelogram).

The scoring system of the invention lends itself to chipless scored patterns. In place of a cutting tool bit a knurled roller can be used, giving a knurled finish to the inner pipe surface. A triangular (cross-section) wheel may be used, pressing a continuous spiral groove into the pipe. A notch-type wheel may be used, giving an interrupted spiral groove.

The addition of extension pieces 52 to both the inlet and outlet ends of the workpiece P permits scoring the entire length of pipe. The use of extension pieces also contributes to the successful scoring of large quantities of pipe. As the scoring assembly mechanism is passed through one length of pipe into an extension piece 52, the air hose and pull-through cable are disconnected, the extension piece is uncoupled and swung around 180 degrees, the air hose and pull-through cable from the opposite wind-up are connected, the extension piece is coupled to the next piece of pipe, and the unit is ready to be pulled through in the opposite direction.

The scoring system of the invention may be run with a minimum of technical expertise. Once the pull-through speed and depth of cut are determined and set, the proper air pressure to the wind-up and drive are supplied, the operation is reduced to connecting and disconnecting, observing the blade and changing when necessary, and replacing the pipe as it is scored.

Although the embodiment of apparatus described herein employs pneumatic pressure and a draw-through mechanical force for the operation of the scoring assembly feed means, it is of course to be understood that other mechanical feed systems may be alternatively employed.

We claim:

1. Apparatus for the controlled depth scoring of a continuous spiral groove on the interior walls of conduits comprising a scoring assembly having inter-connected:
   (a) rotatable controlled depth score cutting means,
   (b) rotatable centering means,
   (c) rotary motor having a stator,
   (d) means for transmitting rotary motion from (c) to (a) and (b), and
   (e) an anti-rotational device, mounted to said stator and contacting the interior walls of said conduits during operation of said scoring assembly, wherein said contact is adapted to prevent rotation of said stator while allowing longitudinal movement of said stator within said conduit; and
   further comprising feed means connected with said scoring assembly for longitudinally passing said scoring assembly through the interior of said conduits at a controllable uniform speed, during rotation of said cutting means and its engagement with said conduit to thereby cut a spiral groove in said conduit.

2. The apparatus of claim 1 wherein said centering means and score cutting means are piston-mounted for engagement with the interior walls of said conduits.

3. The apparatus of claim 2 wherein control means are provided and positioned to actuate said piston-mounted centering means and score cutting means for engagement with said interior walls of said conduits.

4. The apparatus of claims 1, 2, or 3 further comprising non-rotatable skid means to provide centering when said centering means passes over grooves or joints in sections of said conduits.

5. The apparatus of claim 4 wherein elements (a) and (b) are both mounted on one side of element (c) and wherein element (d) is a shaft having at least two universal joints.

* * * * *